US006450366B1

(12) United States Patent
de Laforcade

(10) Patent No.: US 6,450,366 B1
(45) Date of Patent: Sep. 17, 2002

(54) METHODS AND DEVICES FOR DISPENSING A PRODUCT WITH A VARYING CONCENTRATION

(75) Inventor: Vincent de Laforcade, Rambouillet (FR)

(73) Assignee: L'Oreal (S.A.), Paris (FR)

( * ) Notice: Subject to any disclaimer, the term of this patent is extended or adjusted under 35 U.S.C. 154(b) by 31 days.

(21) Appl. No.: 09/686,874

(22) Filed: Oct. 12, 2000

(30) Foreign Application Priority Data

Oct. 12, 1999 (FR) ........................................ 99 12708
Oct. 19, 1999 (FR) ........................................ 99 13024

(51) Int. Cl.$^{7}$ ........................................ G01F 11/00
(52) U.S. Cl. .................... 222/1; 222/145.5; 222/321.7; 222/481.5
(58) Field of Search ........................ 222/1, 136, 145.1, 222/145.5, 145.6, 321.7, 321.9, 481.5

(56) References Cited

U.S. PATENT DOCUMENTS

| | | | | |
|---|---|---|---|---|
| 3,851,800 A | * | 12/1974 | Swain | 222/145.1 |
| 4,893,729 A | | 1/1990 | Iggulden et al. | 222/42 |
| 5,009,342 A | | 4/1991 | Lawrence et al. | 222/136 |
| 5,462,203 A | * | 10/1995 | Stern | 222/145.1 |
| 5,848,732 A | | 12/1998 | Brugger | 222/137 |
| 6,129,245 A | * | 10/2000 | Redman et al. | 222/145.1 |
| 6,340,257 B1 | * | 1/2002 | Chai-Yi et al. | 222/145.1 |

FOREIGN PATENT DOCUMENTS

| | | |
|---|---|---|
| GB | 1152106 | 5/1969 |

OTHER PUBLICATIONS

Co-pending Application—Attorney Docket No. 05725.0884-00000 Title: Methods and Devices for Dispensing a Product and For Selectively Varying a Concentration of the Dispensed Product Inventors(s): Vincent De Laforcade U.S. Filing Date: May 10, 2001.

* cited by examiner

*Primary Examiner*—Joseph A. Kaufman
(74) *Attorney, Agent, or Firm*—Finnegan, Henderson, Farabow, Garrett & Dunner, LLP

(57) ABSTRACT

A dispensing device for dispensing a product includes a first chamber configured to initially contain at least one of a first composition and a mixture of the first composition and a second composition, a second chamber configured to contain the second composition, a flow passage for providing flow of the second composition from the second chamber to the first chamber, and an actuator configured to be actuated to cause an amount of a product to be dispensed from the first chamber. The product dispensed includes at least one of the first composition, the second composition, and the mixture of the first composition and the second composition. The device is configured such that in response to the product being dispensed from the first chamber, an amount of the second composition flows from the second chamber to the first chamber via the flow passage.

218 Claims, 4 Drawing Sheets

METHODS AND DEVICES FOR DISPENSING A PRODUCT WITH A VARYING CONCENTRATION

The present invention relates to a device for dispensing a product and varying the concentration of the product over at least a portion of the period of use of the device. The product being dispensed preferably is in the form of a flowable substance and may be of very liquid to less liquid consistency, such as in the form of a cream or of an emulsion.

In the field of cosmetics in particular, it is known to package compositions containing either a homogenous phase or a number of separate phases to be in a container. In the latter instance, typically after the container has been shaken, the separate phases mix together to form a mixture having substantially constant predetermined concentrations of respective compositions forming the mixture. The value of the concentrations of each of the compositions in the mixture are defined by the initial amounts of the respective compositions disposed in the container. Upon each use of the container to mix and dispense the mixture, the mixture dispensed displays the same concentrations of the respective compositions.

In the field of cosmetics, and in other fields such as pharmacy or dermatology, or cleaning and the like, it may be desirable to vary the concentration of the respective compositions, or active ingredients, in a product being dispensed. In a preferred use, it may be desired to vary the concentration of an active ingredient in a substantially linear manner, from the start to the end of the treatment for which the product is used. For example, such variation in concentration may be desired when using sunscreens wherein, in the first days of exposure the protection offered by the sunscreen may be maximal, or even total, and may then decrease gradually after a person has been exposed to the sun for few days. A similar characteristic may be desired for the use of products containing self-tanning ingredients. In using these products, the user may desire a very subtle skin coloring effect during the first use or first few uses, followed by an increasingly pronounced skin coloring effect after a number of uses. Another example of a product in which it may be desirable to vary the concentration over time is a thinning product, which may have an increasingly powerful thinning action as the product is used. Yet another example includes certain treatments for the skin or for the scalp, which, because of the aggressive action of some ingredients they contain, may require application at gradually increasing or decreasing concentrations, before being at a stabilized final concentration, so that treatment can be pursued with maximum effectiveness. Other related products that may be optimally utilized in varied concentrations over a time period of application include hair dyes and teeth whiteners.

Such application of products in varying concentrations also may be useful in numerous fields and for numerous uses other than cosmetic, pharmaceutical, and dermatological uses. For example, it may be desirable to provide cleaning solutions, shoe polishes, and clothing dyes having varied concentrations over a time period of use of the product.

Conventional techniques for changing the concentration of a product include providing separate packages for each of the different desired concentrations. The numbers of packages required to span a large spectrum of concentration levels may hinder wide-scale personal use of this type of varied-concentration treatment. Furthermore, a system of separate packages for each discrete concentration allows for only a limited number of different concentrations.

U.S. Pat. No. 4,893,729 describes a bottle for a sunscreen composition comprising a container defining two compartments, one containing a lotion and the other containing a sunscreen agent. The two compartments are in communication with a mixing chamber via respective bores. The cross-section of the bore connecting the mixing chamber to the compartment containing the sunscreen is adjustable so as to vary the degree of protection afforded by the sunscreen dispensed. The sunscreen concentration in the dispensed composition is varied in a relatively low number of discrete stages.

One of the objects of the present invention is to provide a dispenser, preferably which can be obtained by molding in a single piece, and allowing the dispensing of a product, such as a cosmetic, pharmaceutical, or dermatalogical composition, for example, which has a concentration that varies over at least part of the period of use of the dispenser to dispense the product.

Another object of the invention is to provide a device in which such a variation in concentration is substantially linear, at least over part of the period of use of the dispenser.

Yet another object of the invention is to provide such a dispensing device for dispensing a product in varying concentrations such that the concentration of various active ingredients or of a particular composition either increases or decreases over a period of use of the dispenser.

Yet another object of the invention is to provide a reliable dispensing device having a relatively simple structure that is economical to produce.

It should be understood that the invention could be practiced without performing one or more of the preferred objects and/or advantages described above. Other objects of the invention will become apparent from the detailed description which follows.

To achieve these and other advantages, and in accordance with the purposes of the invention, as embodied and broadly described herein, the invention includes a device for dispensing a composition, preferably a cosmetic, pharmaceutical or dermatological composition, comprising a first chamber, or container, containing the composition to be dispensed, a means capable, in response to an actuation command, of allowing a given volume of the composition in the first container to be dispensed, a second container, or chamber, containing a modifying composition, and a means capable, in response to the dispensing of the given volume of composition from the first container, of allowing a fraction of said modifying composition to pass from the second container to the first container.

In the case of a composition of low viscosity, the fraction of modifying composition will automatically mix with the composition contained in the first container. For a composition of higher viscosity, it may be necessary to shake the device in order to improve the homogenization of the composition that is to be dispensed.

As a preference, the means capable, in response to the dispensing of said given volume of composition from the first container, of allowing a fraction of said modifying composition to pass from the second container to the first container includes a siphon arranged between the first and second containers. The siphon constitutes a preferred embodiment of the invention in so far as it allows the device to be molded in a single piece without the need for additional valves or other similar means, between the two containers.

As a preference, the dispensing of the composition from the first container occurs without air being taken into the first container, that is, without the dispensed volume of composition from the first container being replaced with a corresponding volume of air. This dispensing without the intake of air makes it possible to create a vacuum inside the first container for drawing a corresponding volume of said modifying composition from the second container into the first container. A corresponding volume or corresponding amount should be understood herein as meaning a volume or amount sufficient to allow pressure equilibrium to be substantially re-established in the dispenser device.

Preferably, an air intake mechanism is provided to allow a volume or amount of air that corresponds approximately to the volume or amount of composition dispensed to enter the second container. This air intake member is especially useful when the second container is in rigid or semi-rigid form.

As an alternative, the modifying composition may be contained inside a flexible bag, such as one made of a metal/thermoplastic complex, or other suitable material, the walls of which may be configured to collapse in on themselves in response to the loss of volume transferred from the second container to the first container. In the latter case, the intake of air into the second container is not needed. Nonetheless, if the flexible bag is contained in a rigid enclosure, the enclosure is preferably at atmospheric pressure so as to allow the bag to deform.

As a preference, the composition from the first container is dispensed under pressure by means, such as a pumping member, for example, a manually actuated pump. Alternatively, the first container may comprise elastically deformable walls and be surmounted by a valve that does not take in air, such as a one-way-opening valve, for example. In this case, the flexible walls essentially form an actuator such that upon squeezing the flexible walls, the product in the first container preferably will be dispensed in such a way as to force the product through an outlet orifice on which the airless valve is mounted, and out of the dispensing device. When the walls thus deformed revert to their initial configuration, for example by elastic return, a corresponding volume of modifying composition is drawn in from the second container. This configuration of the actuator may not lead to a precisely dosed dispensing, and therefore, if such precisely dosed dispensing is desired, a suitable pump configuration like that described above preferably may be employed instead. Other actuators aside from a moveable portion operably coupled to a pump or flexible walls of the container may also be used to cause the product in the first chamber of the device to pass out of the chamber and are contemplated as being within the scope of this invention.

Thus, according to the invention, during the first use or the first few uses of the device to dispense the product, the concentration of a given ingredient (for example a sunscreen) in the product dispensed corresponds to a concentration of the composition initially contained in the first container.

Thereafter, each time there is pumping from the first container, and as long as some modifying composition is in the second container, an equivalent amount of modifying composition contained in the second container is drawn into the first container so that, during this period of use of the dispenser, the total volume of product, whether the first composition only or a mixture of the first composition with the modifying composition, in the first container does not vary appreciably.

Assuming a modifying composition is used which is less concentrated in the active, or effective, ingredient than the composition initially contained in the first container, each amount of modifying composition conveyed from the second container into the first container will play a part in gradually decreasing the concentration of the active ingredient in the product dispensed from the first container and out of the device.

Assuming a modifying composition is used which is more concentrated in the active, or effective, ingredient than the composition contained initially in the first container, each volume of modifying composition conveyed from the second container and into the first container will play a part in gradually increasing the concentration of the active ingredient in the product dispensed from the first container and out of the device.

When all of the contents of the second container have been drawn out of the second container and into the first container, the concentration of the product contained in the first container will stabilize and reach a final value at most equal to the concentration of the modifying composition initially in the second container. In practice, the greater the volume of the second container by comparison with the volume of the first container, the closer the final value of the concentration of the product contained in the first container will be to the concentration of the modifying composition initially in the second container.

Preferably, a flow passage, which, in a preferred embodiment may be in the form of a siphon, is configured to place the first container or chamber in flow communication with the second container or chamber. This flow passage preferably comprises a duct, a first end of which opens into the second container via a first orifice located near its bottom, and a second end of which opens into the first container via a second orifice located at a level below that of the first orifice. Preferably, the duct includes a portion located at a level higher up than the maximum level of product in the second container.

Because of the equilibrium of the pressures inside the device, the two compositions, whose interface zone, possibly formed by an air volume or air lock, is located generally at an uppermost level of the siphon duct, do not mix appreciably. However, it may be desirable to provide means for keeping the composition initially contained in the first container isolated from the modifying composition contained in the second container prior to first use of the dispenser to dispense the product. Such means may be located in the region of the siphon-forming duct and be in the form of a valve or shutter. According to one embodiment, the flow passage duct has, at its uppermost point, a portion having an oblong cross-section. A clip, positioned on the device at the oblong portion, closes off the duct so as to prevent any migration of one composition toward the other. Such a clip may be connected to a cap configured to removably cover the dispensing head. Thus, at the time of first use, when removing the cap, or other suitable removable closure member, the user also removes the clip, thus allowing the two containers to communicate via the flow passage, or duct.

Alternatively, the duct, which may be in the form of a siphon, comprises a first duct portion, in communication with the first container, and a second duct portion in communication with the second container, each of the first and second duct portions having a free end sealed by a removable stopper. The first and second duct portions may be placed in communication, after the removal of the stoppers, at the time of first use of the device. When the two portions are placed in communication, the free end of the first portion may be forcibly pushed into the free end of the second, or vice versa. Other means of connection may be envisaged and are considered to be within the scope of this invention.

As a preference, to dispense the product from the device, an actuator, such as a push-button, for example, is operably coupled to a pump. The pump preferably is configured to be received in an outlet orifice of the first container, the outlet orifice being sealed closed by an inlet duct of the manually actuated pump. This pump may be connected to a dip tube extending from the pump into the first container such that a free end of the dip tube is disposed proximate a bottom portion of the first container.

Also as a preference, the air intake member may be formed as an air intake orifice of the pump, the air intake orifice being in direct flow communication with the second container. For this purpose, the manually actuated pump may be mounted in a neck portion of the device with the neck portion opening separately into the outlet orifice of the first container, and into an intermediate zone in flow communication with the second container. When the pump is placed so as to be received in the outlet orifice of the first container, the air intake member preferably is disposed in the intermediate zone.

As a preference, the maximum fill level of the first and/or of the second container is located below the uppermost point of the flow passage duct. Thus, in order to fill the device, the procedure may include supplying a first composition through the outlet orifice of the first container and into the first container up to a maximum fill level preferably located below the uppermost point of the siphon duct. The modifying composition may be introduced into the second container via the intermediate zone, up to the maximum fill level. By filling the two containers in this manner, a volume of air may be trapped in the flow passage duct between the two compositions, thus isolating the first composition initially in the first container from the modifying composition initially in the second container.

As an alternative, the two containers may be filled from the same container (for example from the first container) with the same composition. For this purpose, the maximum fill level of the first container is located above the uppermost point of the flow passage duct. After that, a concentrate, or the like, capable of modifying the relative concentrations of the composition initially in the first container and of the modifying composition initially in the second container is introduced into one or other of the containers, as desired.

In a preferred form of the device, the neck portion of the dispenser has a screw thread capable of engaging with a corresponding screw thread of a dispensing head on which the pump is mounted. The dispensing head may be closed with a removable cap or other suitable removable cover configured to cover a dispensing outlet of the device.

According to one embodiment, the modifying composition in the second container is such that the curve representing the concentration of at least one active ingredient present in composition pumped from the first container, as a function of the number of doses pumped, has a portion which has a positive slope.

Alternatively, the modifying composition in the second container is such that the curve representing the concentration of at least one active ingredient present in the composition pumped from the first container, as a function of the number of doses pumped, has a portion which has a negative slope.

An aspect of the invention includes a device for dispensing a product including a first chamber configured to initially contain at least one of a first composition and a mixture of the first composition and second composition, a second chamber configured to contain the second composition, a flow passage for providing flow of the second composition from the second chamber to the first chamber, and an actuator configured to be actuated to cause an amount of a product to be dispensed from the first chamber, the product including at least one of the first composition, the second composition, and the mixture of the first composition and the second composition. The device is further configured such that in response to the product being dispensed from the first chamber, an amount of the second composition flows from the second chamber to the first chamber via the flow passage.

Another aspect of the invention includes a device for dispensing a product comprising a first chamber configured to initially contain at least one of a first composition and a mixture of the first composition and a second composition, a second chamber configured to be in flow communication with the first chamber and to contain the second composition, and an actuator configured to be actuated to cause an amount of product contained in the first chamber to be dispensed from the first chamber, the product including at least one of the first composition, the second composition, and the mixture of the first and second compositions, wherein the device is configured such that second composition flows from the second chamber to the first chamber when the product is dispensed, and further wherein the device is configured to automatically vary over time a concentration of the product dispensed from the first chamber.

Another aspect of the invention includes a device for dispensing a product, comprising a first chamber configured to initially contain at least one of a first composition and a mixture of the first composition and a second composition, a second chamber configured to be in flow communication with the first chamber and to contain the second composition, and an actuator configured to be actuated to cause an amount of product contained in the first chamber to be dispensed from the first chamber, the product including one of the first composition, the second composition, and the mixture of the first and second compositions. The device is configured such that second composition flows from the second chamber to the first chamber when the product is dispensed and such that concentration of the product dispensed from the first chamber is a function of a total amount of product that has been dispensed from the first chamber.

Yet another aspect of the invention includes a dispensing device comprising a first chamber configured to initially contain at least one of a first composition and a mixture of the first composition and a second composition, a second chamber configured to contain the second composition, the second chamber being in flow communication with the first chamber, and a portion including a dispensing outlet of the device being in flow communication with the first chamber to dispense contents of the first chamber, wherein the first chamber is at least temporarily sealed from air intake so that the dispensing of the contents of the first chamber via the dispensing outlet induces flow of the second composition from the second chamber to the first chamber.

Yet a further aspect of the invention includes a device comprising first chamber, a second chamber, a portion including a dispensing outlet being in flow communication with the first chamber to dispense contents of the first chamber, and a flow passage for providing flow from the second chamber to the first chamber, wherein the flow passage includes a duct including at least a portion having a substantially U-shaped portion. The substantially U-shaped portion may include a curved section and a pair of leg sections extending from the curved section, the curved section being located above the leg sections and being adjacent to an upper end of the device. A first part of the flow passage preferably initially contains the one of the first composition and the mixture and a second part of the flow passage initially contains the second composition. More preferably, air is initially contained in the flow passage between the first and second parts.

According to yet another aspect of the invention, a dispensing device includes a first chamber, a second chamber, a portion including a dispensing outlet being in flow communication with the first chamber to dispense contents of the first chamber, and a flow passage for providing flow from the second chamber to the first chamber, the flow passage being configured in the form of a siphon. Air may be initially contained in the flow passage between the first and second compositions. The device also may comprise a separation mechanism configured to limit flow through the flow passage.

According to an even further aspect of the invention, a dispensing device comprises a first chamber containing a first composition, a second chamber containing a modifying composition, and means, capable in response to an actuation command, for dispensing a given volume of contents from the first chamber. The dispensing device further includes a flow passage configured, in response to the dispensing of said given volume of contents from the first chamber, for passing a fraction of said modifying composition from the second chamber toward the first chamber. The device preferably is configured such that the given volume of contents being dispensed from the dispenser is initially the first composition and, after at least one actuation command, includes both the first composition and the modifying composition. The device also may be configured such that the contents of the first chamber include increasing amounts of the modifying composition as the contents are dispensed.

Preferably, the device is configured such that an amount of the product in the first chamber remains substantially constant until substantially all of the second composition initially in the second chamber has flowed from the second chamber. The device also may be configured such that the first chamber remains substantially sealed from air intake when the second composition flows into the first chamber via the flow passage.

The device preferably includes an air intake mechanism, such as an air intake orifice, in flow communication with the second chamber, the air intake mechanism being configured to provide flow of intake air into the second chamber. The air intake mechanism may be configured to flow an amount of air from outside the device into the second chamber, the amount of air corresponding approximately to the amount of the second composition flowing from the second chamber via the flow passage. Similarly, the amount of air flowed into the second chamber via the air intake may be approximately equal to an amount of product dispensed from the first chamber.

In a preferred embodiment, a flow passage of a device according to the invention includes a duct having a first end opening into the second chamber and a second end opening into the first chamber. The duct may include a portion having an inverted U-shaped configuration, the portion being between the first end and the second end. An uppermost point of the portion preferably is located above the first and second ends and at least one of a maximum fill level of the first chamber and a maximum fill level of the second chamber preferably is below an uppermost point of the portion. The second end of the duct may be disposed below the first end of the duct. The flow passage may be configured to prevent flow communication of the first and second chambers prior to a first use of the device to dispense the product.

The flow passage also may be configured in the form of a siphon and at least one, and possibly both, of a maximum fill level of the first chamber and a maximum fill level of the second chamber may be located below an uppermost point of the siphon. Alternatively, at least one of a maximum fill level of the first chamber and a maximum fill level of the second chamber may be located above an uppermost point of the siphon.

A device according to the invention may further include a pump in flow communication with the first chamber. Actuation of the pump causes the pump to dispense the product from the first chamber. In a preferred form of the invention the pump is a manually actuated pump, and the actuator is a moveable portion provided on the pump, such as a push-button for example. A dip tube extending from the pump into the first chamber to place the pump in flow communication with the first chamber also may be provided. Preferably, the pump includes an air intake orifice configured to flow air from outside the device into the second chamber. Even more preferably, the pump is configured such that the pump does not provide intake air flow into the first chamber. A neck portion may be disposed proximate top portions of the first and second chambers, the neck portion being configured to receive the pump. The neck portion preferably opens so as to be in flow communication with the second chamber and with the first chamber when the pump is not received in the neck portion. Preferably, the pump is configured to be threadedly engaged with the neck portion, and may have a portion which sealably closes an orifice leading to the first chamber.

The pump preferably is configured such that actuation of the actuator causes the pump to dispense an amount of the product from the first chamber without providing intake of air into the first chamber. The pump also preferably is configured to provide intake flow of a corresponding volume of air into the second chamber.

The device preferably is configured such that the second composition flows from the first chamber to the second chamber to permit mixing of the second composition with the contents of the first chamber. A pump provided with the device preferably applies a vacuum force to remove contents from the first chamber, the vacuum force inducing the flow of the second composition from the second chamber to the first chamber.

The device may include a removable separation mechanism configured to prevent flow communication between the first and second chambers. The removable separation mechanism may include an external clamp configured to clamp an external portion of the device. The device also may include a removable cover configured to cover a dispensing orifice through which the product is dispensed from the device. Preferably, the removable separation mechanism is configured to place the first and second chambers in flow communication with each other in response to removal of the cover.

The device preferably is configured such that a curve of the ratio of the amount of second composition in the product dispensed from the device to the amount of first composition in the product dispensed from the device as a function of the amount of the product dispensed from the device, has at least one portion having a positive slope.

According to another aspect of the invention, the device is configured such that the ratio of the amount of second composition in the product dispensed from the device to the amount of first composition in the product dispensed from the device ranges from approximately zero to approximately infinity. Preferably, the ratio remains the same or increases when the actuator is actuated multiple times.

The first chamber of the device may initially contain either the first composition alone or a mixture of the first and second compositions and the second chamber contains the second composition. According to the invention, the dispensing device may be configured to automatically vary an amount of the second composition in the product being dispensed. Preferably, the product dispensed from the first chamber is dispensed from the device.

Preferably, at least one of the first and second compositions dispensed according to the invention has an effect chosen from at least one of a cosmetic, pharmaceutical, and dermatological effect. For example, the effect may be on skin color, hair color, and/or sun protection factor. According to one aspect of the invention, the first composition includes a sunscreen and the second composition tends to reduce a sun protection factor of the sunscreen as it mixes with the first composition in the first chamber. The device may be configured such that a sun protection factor of the product being dispensed from the device decreases as a function of a total amount of the product that has been dispensed from the device. According to another aspect of the invention, the second composition may include a skin darkening pigment and an amount of the skin darkening pigment in the product being dispensed from the device increases as a function of a total amount of the product that has been dispensed from the device.

Preferably, the first and second chambers of the device are formed by molding plastic material into a single piece. The plastic material may include a thermoplastic material, such as a thermoplastic material chosen from one of a polypropylene and a polyethylene. The first and second chambers may have approximately the same volume. The bottom of the second chamber may be above the bottom of the first chamber.

The device preferably is configured such that the second composition flowing into the first chamber via the flow passage becomes mixed with the product in the first chamber. More preferably, the device is configured such that the product being dispensed from the dispenser is initially the first composition and then the product being dispensed is the mixture of the first and second compositions. As contents of the first chamber are dispensed, the contents in the first chamber preferably include increasing amounts of the second composition.

The device also may be configured such that the amount of second composition passing into the first chamber substantially corresponds to the amount of product dispensed from the first chamber. Preferably, actuation of the actuator causes a portion of the product in the first chamber to be dispensed and a portion of the second composition to flow through the flow passage toward the first chamber. Any of the devices according to the invention also may be configured to automatically vary an amount of the second composition in the product being dispensed.

The devices according to the invention preferably have a size permitting the device to be held in a single hand of the user while the contents are dispensed.

Another aspect of the invention includes a method of dispensing comprising providing a dispenser having a first chamber containing at least one of a first composition and a mixture of the first composition and a second composition, and a second chamber containing the second composition, the first and second chambers being in flow communication with each other. The contents of the first chamber are flowed from the dispenser to dispense a portion of the contents and the second composition is passed from the second chamber to the first chamber in response to the portion of the contents of the first chamber being dispensed.

Yet a further aspect of the invention includes a method of dispensing a product comprising providing a dispenser containing a first composition and a second composition substantially separated from one another prior to dispensing, the first composition and the second composition having at least one differing characteristic. The method further includes flowing a product from the dispenser, the product including relative amounts of the first and second compositions and increasing, in response to a total amount of product flowed from the dispenser, the amount of second composition in the product flowing from the dispenser.

The method according to an aspect of the invention preferably further comprises initially flowing the first composition alone from the dispenser and then mixing together the first composition and the second composition during the flowing of the product from the dispenser.

Preferably, the method according to an aspect of the invention further includes preventing flow communication between the first and second chambers prior to a first flowing of the contents from the first chamber and then placing the first and second chambers in flow communication with each other.

The flowing from the dispenser preferably includes initially flowing the first composition and then flowing the mixture from the dispenser. Preferably, an amount of second composition in the mixture increases as more second composition is passed into the second chamber.

The method also may include mixing the second composition passing into the first chamber with the contents of the first chamber. The passing may include flowing the second composition from the second chamber toward the first chamber in an amount substantially equal to the amount of the contents flowing from the first chamber.

According to a preferred aspect, the method includes intaking an amount of air from outside the dispenser into the second chamber in an amount substantially equal to the amount of the second composition that flows from the second chamber toward the first chamber during the passing.

The flowing from the first chamber may include pumping from the first chamber via a pump in flow communication with the first chamber. The pump preferably includes an air intake orifice, the air intake orifice flowing air outside the dispenser into the second chamber during pumping.

Preferably the method further comprises varying the respective amounts of the first composition and the second composition in the contents as a function of a total amount of the contents flowed from the first chamber.

The flowing of the contents of the first chamber preferably includes automatically varying the respective amounts of the first composition and the second composition in the contents in the first chamber in response to the flowing, and also may include flowing the second composition from the first chamber after a predetermined amount of one of the first composition and the mixture has flowed from the first chamber.

The flowing from the first chamber preferably includes flowing without air intake into the first chamber when the second chamber contains the second composition.

The method may also include passing the second composition via a flow passage including a siphon.

Preferably, an amount of the product in the first chamber remains substantially constant until substantially all of the second composition initially contained in the second chamber has passed from the second chamber toward the first chamber. Even more preferably, air is prevented from flowing into the first chamber when the second chamber contains the second composition.

Another aspect of the invention includes a method of treating a surface, the method comprising dispensing a product including a treatment agent from a dispenser onto a surface to be treated and varying a concentration of the treatment agent in the product based on a total amount of the product that has been dispensed from the dispenser, wherein the concentration of the treatment agent in the product varies within a range of from approximately zero to approximately one hundred percent.

The methods of the invention may include applying the product dispensed to skin of an individual for changing skin color or for providing sun protection factor to the skin. Alternatively, the invention may include applying the product dispensed to hair of an individual for changing hair color.

The concentration of an active agent in the product being dispensed may either increase from approximately zero percent to approximately 100 percent or decrease from approximately 100 percent to approximately zero percent as product is dispensed from the dispenser.

Yet other aspects of the invention include a method of dispensing a product, the method comprising providing one of the devices according to the invention with the first chamber containing at least the first composition and the second chamber containing the second composition and actuating the actuator to dispense an amount of the product from the first chamber and out of the device. Preferably, the method further comprises varying relative amounts of the first composition and the second composition dispensed out of the device by actuating the actuator a predetermined number of times. The relative amounts of the first composition and the second composition in the product dispensed out of the device may also be varied as a function of a total amount of the product dispensed out of the device.

Yet another aspect of the invention includes a method of dispensing a product, the method comprising providing a device according to the invention with the first chamber containing at least a first composition and the second chamber containing a second composition and dispensing an amount of product from the first chamber and out of the device, the product including at least one of the first composition and a mixture of the first and second compositions.

The methods described above further include applying the dispensed product to a surface, such as hair or skin, to at least one of change hair color, change skin color, and/or provide sun protection.

Yet a further aspect of the invention includes a method of making a device to dispense a product, the method comprising optionally forming the first and the second chambers of a device according to the invention, preventing flow communication between the first and second chambers, and filling the first chamber with the first composition and filling the second chamber with the second composition. The filling of the first and second chambers may occur simultaneously and also may include directly supplying the first and second compositions to the respective first and second chambers. The filling of the first chamber also may include supplying the first composition through second chamber to the first chamber. Similarly, the filling the second chamber may include supplying the second composition through the first chamber to the second chamber.

Besides the structural and procedural arrangements set forth above, the invention could include a number of other arrangements, such as those explained hereinafter. It is to be understood that both the foregoing description and the following description are exemplary, and are intended to provide further explanation of the invention as claimed.

The accompanying drawings are included to provide a further understanding of the invention and are incorporated in and constitute a part of this specification. The drawings illustrate embodiments of the invention and, together with the description, serve to explain the principles of the invention. In the drawings, FIG. 1A is a perspective view of a dispensing device according to an aspect of the invention;

Figure 4A:
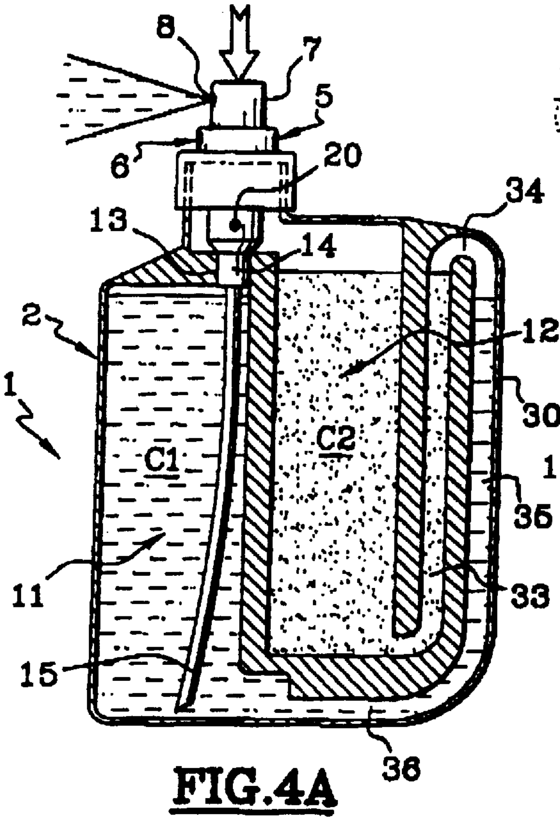
FIG. 4A is a partial vertical cross-sectional view showing a use of the dispensing devices of FIGS. 1A–2A for dispensing a product according to an aspect of the invention.
Figure 4B:
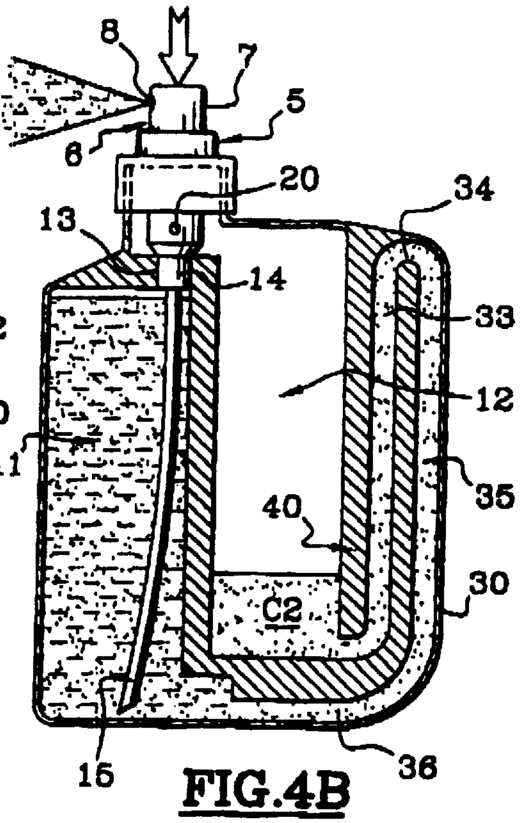
Figure 4C:
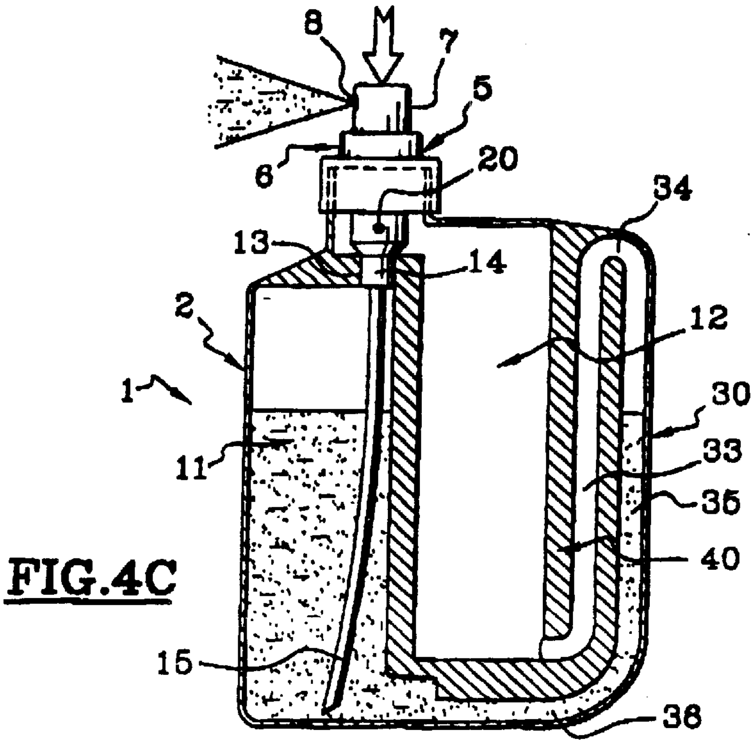

FIG. 4B is a partial cross-sectional view showing a use of the dispensing devices of FIGS. 1A–2A for dispensing a product at a stage subsequent to the use of FIG. 4A according to an aspect of the invention; and FIG. 4C is a partial cross-sectional view showing a use of the dispensing devices of FIGS. 1A–2A for dispensing a product at a stage subsequent to the use of FIG. 4B according to an aspect of the invention.

Reference will now be made in detail to the present preferred embodiments of the invention, examples of which are illustrated in the accompanying drawings. Wherever possible, the same reference numbers are used in the drawings and the description to refer to the same or like parts, and the same reference numbers with alphabetical suffixes are used to refer to similar parts.

Figure 1A:
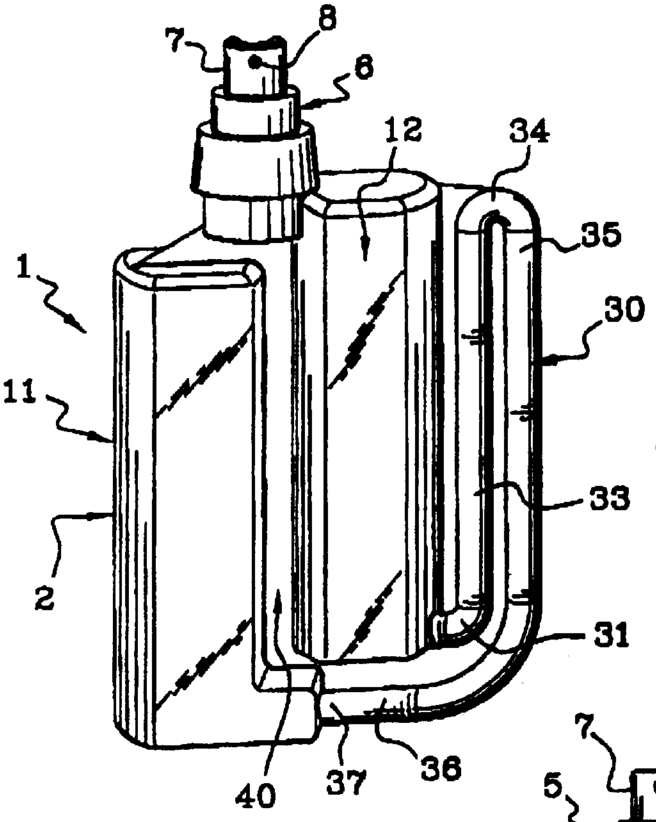
FIG. 1B is a vertical cross-sectional view of the dispensing device of FIG. 1.
Figure 1B:
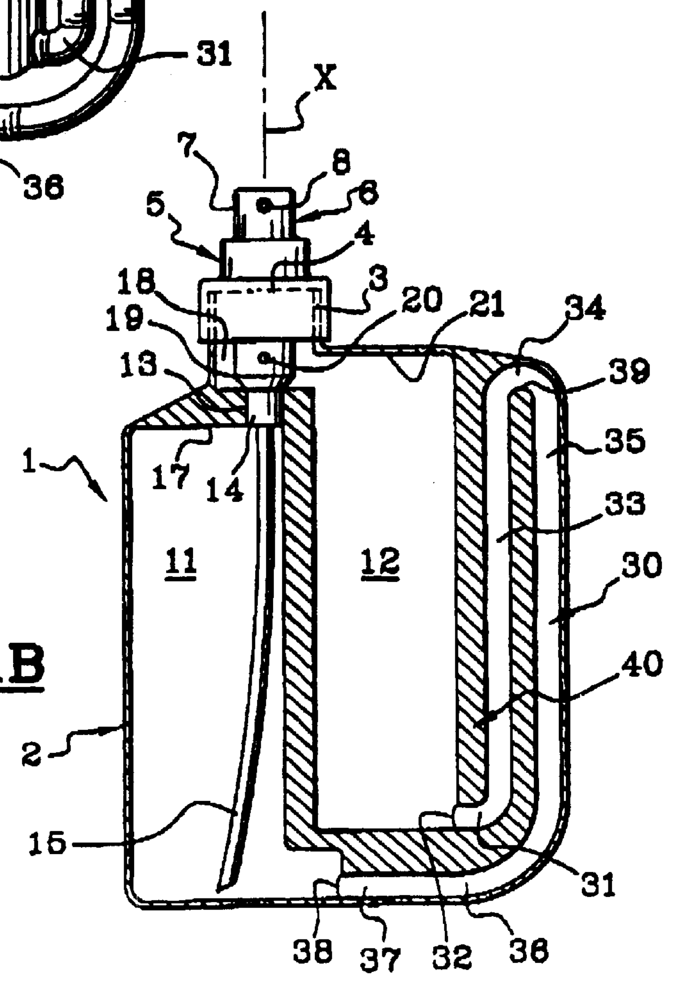

As depicted in FIGS. 1A–1B, the device 1 according to one particular embodiment comprises a rigid or semi-rigid body 2, the cross section of which is of elongate shape. The body 2 has a neck portion 3 at one end and a free edge 4 of the neck portion 3 defines an opening in which an actuatable pump 5 is mounted. The pump 5 preferably is manually actuated by an axially moveable actuator portion 7. The neck portion 3 and the pump 5 are arranged along an axis X, preferably extending from one end of the body 2 to the other opposite end. The pump 5 is surmounted by a dispensing head 6, including the actuator portion 7, so as to allow the pump 5 to be actuated. The moveable portion 7 preferably is in the form of a push-button or other similar mechanism. Actuation of the pump 5 causes at least one composition to be dispensed out of the a dispensing orifice 8 defined by the moveable portion 7. The dispensing head 6, on which the pump 5 is mounted, includes a screw thread (not shown) capable of engaging with a corresponding screw thread provided on the outer surface of the neck portion 3.

The body 2 defines two volumes, essentially defining a first chamber 11 configured to initially hold a composition C1 to be dispensed, and a second chamber 12 intended to initially hold a composition C2. The compositions C1 and C2 have differing characteristics and upon mixing form a third composition having a third characteristic. The composition C2 may be referred to as a modifying composition since it modifies the concentration of the composition C1, and thus can also preferably modify the characteristics and effects of the composition C1, initially contained in the first chamber 11, as it moves from the second chamber 12 into the first chamber 11 to mix with the composition C1.

The first chamber 11 defines an outlet orifice 13 arranged along the axis X and configured to receive, in a sealed fashion, an inlet duct 14 of the pump 5. Dip tube 15 extends from the duct 14 into the first chamber 11, such that the free end of the dip tube 15 is disposed proximate the bottom of the first chamber 11. The first chamber 11 has a maximum fill level corresponding approximately to a transverse surface 17, formed inside the chamber 11, and partially defining the outlet orifice 13. An opening of the outlet orifice 13 in flow communication with the chamber 11 preferably is substantially flush with the transverse surface 17.

The second chamber 12 is arranged so that it is slightly axially offset above the first chamber 11, and is of substantially the same volume as the volume of the first chamber 11. However, it is contemplated that the relative volumes of the two chambers may be changed as desired to change the variation of the concentration of the product dispensed over the use of the dispensing device. One of ordinary skill in the art would understand how to size the volumes of the chambers to effect the change in concentration depending on such factors as the initial concentrations of the two compositions initially in each of the chambers, the relative mixing capabilities of the two compositions, and other similar factors. The second chamber 12 is in flow communication with an intermediate zone 18 extending in a continuation of the neck portion 3 above the first container 11. In the mounted position, a larger cross-section portion 19 of the inlet duct 14 of the pump 5 is disposed within the intermediate zone 18. This portion 19 of larger cross section of the duct 14 is in flow communication with an air intake orifice 20 for the pump 5. Thus, the air intake orifice 20 is in flow communication with the second chamber 12 and is isolated from the first chamber 11 when the second chamber 12 or the duct 30 contains a product. According to this embodiment, the maximum fill level of the second chamber 12 roughly corresponds to the level of the wall which includes transverse surface 17 in which the orifice 13 of the first chamber 11 is made.

The first chamber 11 is configured to be placed in flow communication to the second chamber 12 via a flow passage 30, preferably in the form of an inverted U-shaped duct which, in a preferred embodiment, may be a siphon duct. One end 31 of the flow passage 30 opens into the second chamber 12 via an orifice 32 disposed at the bottom of the second chamber 12. The flow passage 30 has a first duct portion 33 rising up over practically the entire height of the body 2 of the dispenser and connecting onto a U-shaped duct portion 34. U-shaped duct portion 34 then connects to a second duct portion 35 extending down along substantially the entire height of the body 2. The uppermost point 39 of the U-shaped duct portion 34, and of the flow passage 30, is located at approximately the same axial position as the maximum fill level of the second chamber 12. The second duct portion 35 is continued by a lateral part 36, extending from the end of the second duct portion 35 opposite to the U-shaped duct 34 and forming an angle with the second duct portion 35 of approximately 90°. An end 37 of the lateral duct portion 36 defines an orifice 38 in flow communication with the first chamber 11. The orifice 38 is located beneath the orifice 32. Joining zones 40, in the form of a relatively thick wall, are formed between the first chamber 11, the second chamber 12 and the various duct portions of the flow passage 30.

The body 2 of the dispenser 1 preferably is formed by molding as a single piece of a material, for example a thermoplastic such as a polyethylene or a polypropylene, or the like.

Figure 2A:
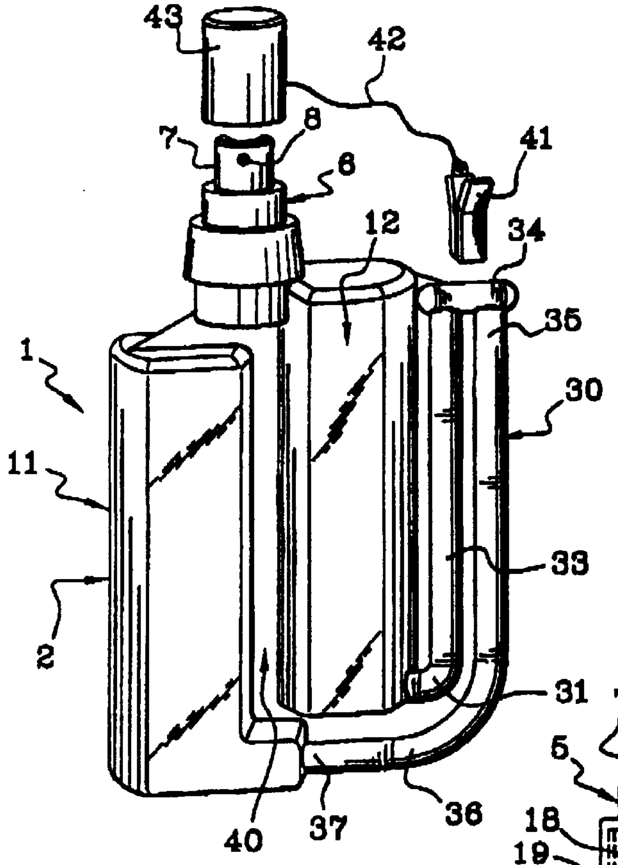
FIG. 2A is a perspective view of a dispensing device including a removable closure and clamp mechanism useable with the device according to an aspect of the invention.
Figure 2B:
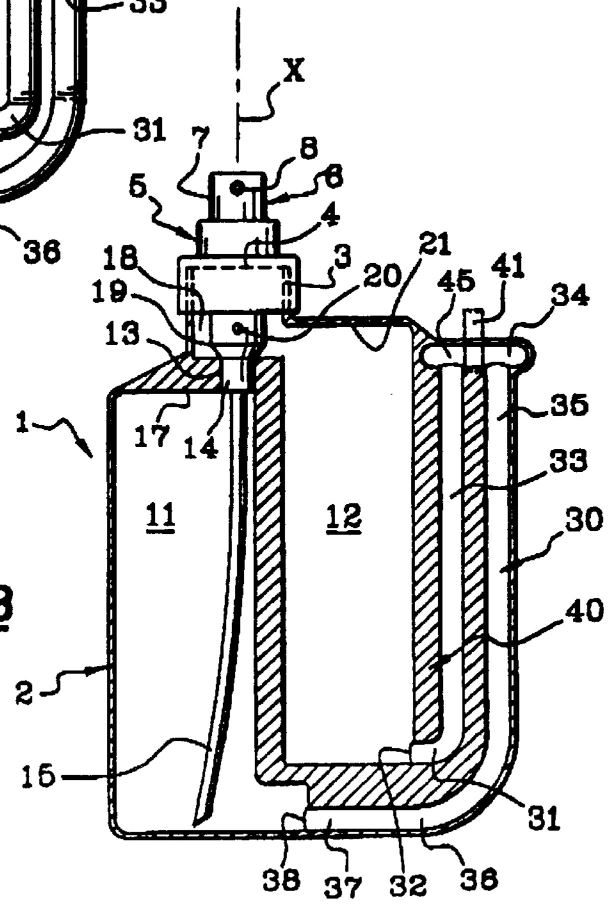
FIG. 2B is a vertical cross-sectional view of a dispensing device showin the engagement of the clamp mechanism of FIG. 2A with the device according to and aspect of the invention.

As shown in FIGS. 2A–2B, the flow passage 30 preferably has a hollow oblong shape near the top of the U-shaped duct portion 34. This hollow oblong shape is configured to be deformed and the inner walls of this section held together by a removable clamp mechanism 41, for example in the form of a clip, connected, via a cord 42, to a removable cap 43 configured to cover the dispensing head 6 between uses. Thus fitted, the clip 41 hermetically isolates the composition C2 contained in the second chamber 12 from the composition C1 contained in the first chamber 11, essentially by clamping the U-shaped duct portion 34 and thereby closing off flow communication between the first and second chambers 11, 12. The risk of premature or untimely mixing of the compositions C1 and C2 is thus reduced, particularly while the device is being transported around before it is first used.

Upon first use, by removing the cap 43, tension is exerted on the clip 41 via the cord 42, and the clip 41 is removed. This permits the hollow oblong section 34 to expand and permit flow communication between the first chamber 11 and the second chamber 12. The clip 41 can be fitted either before the two chambers 11, 12 are filled, between the filling of the first chamber 11 and the filling of the second chamber 12, or after both chambers 11, 12 have been filled.

Figure 3A:
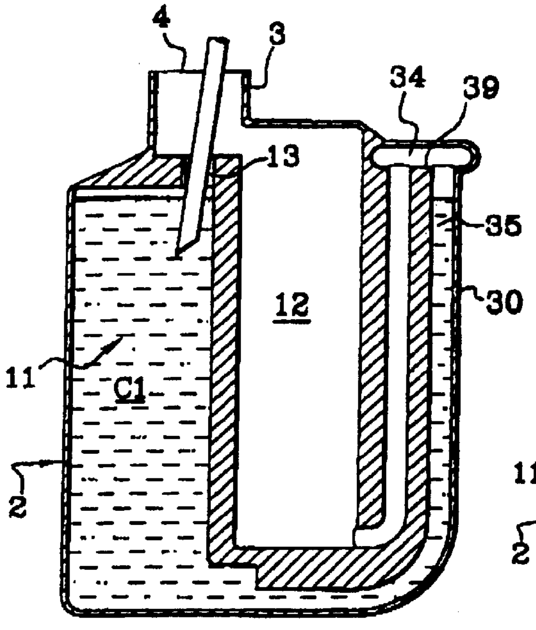
FIG. 3A is a partial vertical cross-sectional view showing a stage of filling the dispensing devices of FIGS. 1A–2B according to an aspect of the invention.
Figure 3B:
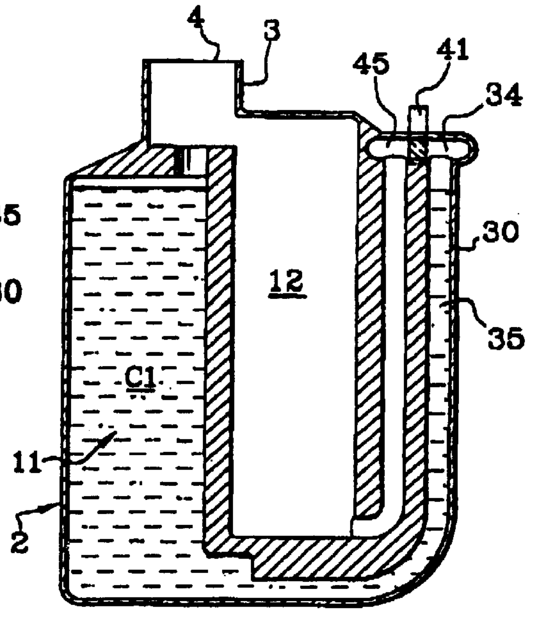
FIG. 3B is a partial vertical cross-sectional view showing another stage of filling the dispensing devices of FIGS. 1A–2B subsequent to the stage of filling in FIG. 3A according to an aspect of the invention.
Figure 3C:
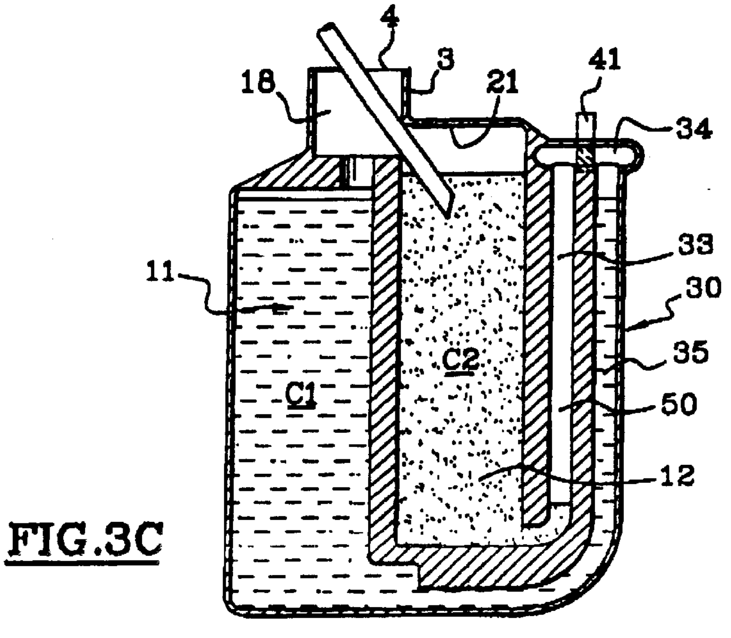
FIG. 3C is a partial vertical cross-sectional view showing a stage of filling the dispensing devices of FIGS. 1A–2B subsequent to the stage shown in FIG. 3B according to yet a further aspect of the invention.

To fill the dispenser 1, the procedure used may be that illustrated in FIGS. 3A–3C. In FIG. 3A, the composition C1 is introduced into the first chamber 11, via the orifice 13 until the composition C1 reaches the maximum level approximately corresponding to the transverse wall 17, as described above. The composition C1 also rises up in the second duct portion 35 of the duct 30, without, however, reaching the uppermost point 39 of the wall of the U-shaped duct portion 34 separating the first duct portion 33 from the second duct portion 35. At this point, the clip 41 may be fitted on the portion 45 of oblong cross section of the siphon duct 30. Next, via the intermediate zone 18, a filling device, preferably in the form of a bent lance, is introduced into the second chamber 12. The composition C2 is introduced into the second chamber 12, until it reaches a maximum fill level located below the wall in which the orifice 13 of the first chamber 11 is formed. The composition C2 rises up into the first duct portion 33 of the duct 30, preceded by a volume of air 50. The dispensing head 6 is then screwed onto the neck portion 3 of the dispenser 1, with the inlet duct 14 in sealed engagement inside the orifice 13 (see FIGS. 1B and 2B). The cap 43, as shown in FIG. 2A, connected to the clip 41, is then positioned over the dispensing head 6. The dispenser is thus ready for use.

The various phases of use of such a dispensing device are depicted in FIGS. 4A–4C. In FIG. 4A, by actuating the pump 5 for the first time, an amount of product in the form of the composition C1 initially contained alone in the first chamber 11 is dispensed. In response to the pressure decrease generated in the first chamber 11, due to the absence of the intake of air into the first chamber, substantially the same amount of composition C1 in the duct portion 35 of the duct 30 is drawn into the first chamber 11 to replace the amount of the composition C1 that was pumped out of the first chamber 11. An intake of air in the second chamber 12 occurs via the air intake orifice 20 of the pump 5. Thus, the amount of product inside the first container 11 remains substantially constant and the pressure in the dispenser reaches equilibrium. During this first phase of use, the concentration of the product dispensed from the dispenser 1 is constant, and corresponds to the concentration of the composition C1 initially disposed in the first chamber 11. This phase of use may continue for a number of dispsensing operations, that is to say until the composition C2 in the second chamber 12 first begins to enter the first chamber 11. The number of dispensing operations in this first phase of use depends on the amount of composition C1 initially present in the first duct portion 35 of the duct 30, on the amount of air, if any, trapped between the compositions C1 and C2 inside the duct 30, and on the amount of each dose pumped out of the first chamber 11 and the dispenser by the pump 5.

After this first phase of use, as illustrated in FIG. 4B, and from the moment when the composition C2 begins to be drawn into the first chamber 11 , there is, depending on the relative concentrations of the compositions C1 and C2, an effect of either diluting or of concentrating an active ingredient in the product being dispensed from the first chamber 11 and out of the dispenser by the pump 5. In this second phase of use, the volume of the mixture of the compositions C1 and C2, essentially forming a mixed composition C1+C2, in the first chamber 11 remains constant. This effect of dilution or of concentration of the product being pumped from the first chamber 11 and out of the dispenser occurs gradually in response to each pumping operation using the pump 5. Also during this phase of operation, the amount of composition C2 contained in the second chamber 12 decreases gradually until it becomes zero.

A last phase of the operation of the dispensing device is shown in FIG. 4C. Having completely emptied the second chamber 12, the composition C1+C2 in the first chamber has a concentration that is somewhere intermediate between the initial concentration of the composition C1 and the initial concentration of the composition C2. The ratio of the volumes of the first and second chambers controls the value of the final concentration of the composition C1+C2 in the first chamber 11. During this phase of use, for each operation of pumping the composition C1+C2, the amount pumped from the dispenser is no longer replaced by a corresponding amount from the chamber 12 or the duct 30. Thus, the level of the product in the first chamber 11 gradually decreases. By contrast, the concentration of the mixture composition C1+C2 is constant. This last phase continues until the first chamber 11, and thus the entire dispenser 1, is completely empty.

Overall, the dispensing operation described above comprises three main phases: a first phase (generally the shortest) in which a product comprising only the composition C1 is dispensed; a second phase in which a product comprising a mixture of the compositions C1 and C2 is dispensed, in a concentration that changes gradually, for example; and a third phase in which a product comprising a composition having a constant concentration, either between the compositions C1 and C2, or possibly equal to the concentration of the composition C2 initially present in the second chamber, is dispensed until the dispenser is empty.

The relative length of each of the three phases of use of the dispenser and the slope of the concentration curve in the second phase, are adjustable by a suitable selection of the main parameters of the dispenser which include, for example, the respective volumes of each chamber, the initial concentration of each of the compositions C1 and C2, the amount of product in each dose of the product pumped out of the dispenser and the first chamber, and the configuration of the flow passage placing the first and second chambers in flow communication.

It is contemplated that the compositions C1 and C2 can have many different forms, such as a liquid, semi-liquid, or solid particulate, and preferably are in the form of a flowable substance. Preferably, the compositions are cosmetic, dermatological, or pharmaceutical compositions used for treating the hair or the skin, however, in its broadest aspects, the present invention could be used to store and dispense many other types of flowable substances. For example, the dispenser may be used to dispense a variety of products, such as cleaning solutions, polishes, clothing dyes, or the like, for which application in a varying concentration over time is desired. Furthermore, sizes of various structural parts and materials used to make these parts are illustrative and exemplary only and one of ordinary skill in the art would recognize that these materials and sizes can be changed as necessary to product different effects or desired characteristics of the dispensing assembly.

It will be apparent to those skilled in the art that various modifications and variations can be made to the structure and methodology of the present invention without departing from the scope or spirit of the invention. Thus, it should be understood that the invention is not limited to the examples discussed in the specification. Rather, the present invention is intended to cover modifications and variations of this invention, provided they fall within the scope of the following claims and their equivalents.

What is claimed is:

1. A device for dispensing a product, comprising:

a first chamber configured to initially contain at least one of a first composition and a mixture of the first composition and second composition;

a second chamber configured to contain the second composition;

a flow passage for providing flow of the second composition from the second chamber to the first chamber; and an actuator configured to be actuated to cause an amount of a product to be dispensed from the first chamber, the product including at least one of the first composition, the second composition, and the mixture of the first composition and the second composition, wherein the device is configured such that in response to the product being dispensed from the first chamber, an amount of the second composition flows from the second chamber to the first chamber via the flow passage.

2. The device of claim 1, wherein the device is configured such that an amount of the product in the first chamber remains substantially constant until substantially all of the second composition initially in the second chamber has flowed from the second chamber.

3. The device of claim 1, wherein the device is configured such that the first chamber remains substantially sealed from air intake when the second composition flows into the first chamber via the flow passage.

4. The device of claim 1, further comprising an air intake mechanism in flow communication with the second chamber, the air intake mechanism being configured to provide flow of intake air into the second chamber.

5. The device of claim 4, wherein the air intake mechanism is configured to flow an amount of air from outside the device into the second chamber, the amount of air corresponding approximately to the amount of the second composition flowing from the second chamber via the flow passage.

6. The device of claim 1, wherein the flow passage includes a duct having a first end opening into the second chamber and a second end opening into the first chamber.

7. The device of claim 6, wherein the duct includes a portion having an inverted U-shaped configuration, the portion being between the first end and the second end.

8. The device of claim 7, wherein an uppermost point of the portion is located above the first and second ends.

9. The device of claim 7, wherein at least one of a maximum fill level of the first chamber and a maximum fill level of the second chamber is below an uppermost point of the portion.

10. The device of claim 7, wherein the second end of the duct is disposed below the first end of the duct.

11. The device of claim 1, wherein the flow passage is configured in the form of a siphon.

12. The device of claim 11, the flow passage includes a duct having a first end opening into the second chamber and a second end opening into the first chamber, the second end being located below the first end.

13. The device of claim 11, wherein at least one of a maximum fill level of the first chamber and a maximum fill level of the second chamber is located below an uppermost point of the siphon.

14. The device of claim 11, wherein a maximum fill level of the first chamber and a maximum fill level of the second chamber is located below an uppermost point of the siphon.

15. The device of claim 1, further comprising a pump in flow communication with the first chamber, actuation of the actuator causing the pump to dispense the product from the first chamber.

16. The device of claim 15, wherein the pump is a manually actuated pump, and wherein the actuator is a moveable portion provided on the pump.

17. The device of claim 15, further comprising a dip tube extending from the pump into the first chamber to place the pump in flow communication with the first chamber.

18. The device of claim 15, wherein the pump includes an air intake orifice configured to flow air from outside the device into the second chamber.

19. The device of claim 15, wherein the pump is configured such that the pump does not provide intake air flow into the first chamber.

20. The device of claim 15, further comprising a neck portion disposed proximate top portions of the first and second chambers, the neck portion being configured to receive the pump.

21. The device of claim 20, wherein the neck portion opens so as to be in flow communication with the second chamber and with the first chamber when the pump is not received in the neck portion.

22. The device of claim 20, wherein the pump is configured to be threadedly engaged with the neck portion.

23. The device of claim 15, wherein a portion of the pump sealably closes an orifice leading to the first chamber.

24. The device of claim 15, wherein the pump is configured such that actuation of the actuator causes the pump to dispense an amount of the product from the first chamber without providing intake of air into the first chamber, and wherein the pump is also configured to provide intake flow of a corresponding volume of air into the second chamber.

25. The device of claim 1, further comprising a removable separation mechanism configured to prevent flow communication between the first and second chambers.

26. The device of claim 25, wherein the removable separation mechanism includes an external clamp configured to clamp an external portion of the device.

27. The device of claim 26, further comprising a removable cover configured to cover a dispensing orifice through which the product is dispensed from the device, said removable separation mechanism being configured to place the first and second chambers in flow communication with each other in response to removal of the cover.

28. The device of claim 1, wherein the device is configured such that a curve of the ratio of the amount of second composition in the product dispensed from the device to the amount of first composition in the product dispensed from the device as a function of the amount of the product dispensed from the device, has at least one portion having a positive slope.

29. The device of claim 1, wherein the device is configured such that the ratio of the amount of second composition in the product dispensed from the device to the amount of first composition in the product dispensed from the device ranges from approximately zero to approximately infinity.

30. The device of claim 29, wherein the ratio remains the same or increases when the actuator is actuated multiple times.

31. The device of claim 1, wherein the first chamber initially contains one of the first composition and the mixture of the first and second compositions and the second chamber contains the second composition.

32. The device of claim 31, wherein at least one of the first and second compositions has an effect chosen from at least one of a cosmetic, pharmaceutical, and dermatological effect.

33. The device of claim 31, wherein the first composition includes a sunscreen and the second composition tends to reduce a sun protection factor of the sunscreen as it mixes with the first composition in the first chamber.

34. The device of claim 33, wherein the device is configured such that a sun protection factor of the product being dispensed from the device decreases as a function of a total amount of the product that has been dispensed from the device.

35. The device of claim 31, wherein the second composition includes a skin darkening pigment and an amount of the skin darkening pigment in the product being dispensed from the device increases as a function of a total amount of the product that has been dispensed from the device.

36. The device of claim 1, wherein the first and second chambers are formed by molding plastic material into a single piece.

37. The device of claim 36, wherein the plastic material includes a thermoplastic material.

38. The device of claim 37, wherein the thermoplastic material is chosen from one of a polypropylene and a polyethylene.

39. The device of claim 1, wherein the device is configured such that the second composition flowing into the first chamber via the flow passage becomes mixed with the product in the first chamber.

40. The device of claim 1, wherein the device is configured such that the product being dispensed from the dispenser is initially the first composition and then the product being dispensed is the mixture of the first and second compositions.

41. The device of claim 1, wherein the device is configured such that the amount of second composition passing into the first chamber substantially corresponds to the amount of product dispensed from the first chamber.

42. The device of claim 1, wherein the device is configured such that actuation of the actuator causes a portion of the product in the first chamber to be dispensed and a portion of the second composition to flow through the flow passage toward the first chamber.

43. A device for dispensing a product, comprising:

a first chamber configured to initially contain at least one of a first composition and a mixture of the first composition and a second composition;

a second chamber configured to be in flow communication with the first chamber and to contain the second composition; and an actuator configured to be actuated to cause an amount of product contained in the first chamber to be dispensed from the first chamber, the product including at least one of the first composition, the second composition, and the mixture of the first and second compositions, wherein the device is configured such that second composition flows from the second chamber to the first chamber when the product is dispensed, and wherein the device is configured to automatically vary over time a concentration of the product dispensed from the first chamber.

44. The device of claim 43, wherein the device is configured to automatically vary an amount of the second composition in the product being dispensed.

45. The device of claim 43, wherein the first chamber initially contains one of the first composition and the mixture, and the second chamber contains the second composition, and wherein the product dispensed from the first chamber has an effect that varies with the concentration of the product.

46. The device of claim 45, wherein the effect is chosen from at least one of a cosmetic, dermatological, and pharmaceutical effect on at least one of skin and hair.

47. The device of claim 43, further comprising a flow passage for placing the first and second chambers in flow communication with each other.

48. The device of claim 47, wherein the flow passage has a first end opening into the second chamber, a second end opening into the first chamber, and a substantially inverted U-shaped portion between the first and the second ends.

49. The device of claim 47, wherein the flow passage is configured to prevent flow communication of the first and second chambers prior to a first use of the device to dispense the product.

50. The device of claim 49, further comprising a removable cover configured to cover a dispensing orifice through which the product flows from the first chamber and out of the device, wherein removing the removable cover permits the flow passage to place the first and second chambers in flow communication.

51. The device of claim 50, wherein the removable cover is operably coupled to a clamping mechanism configured to clamp the flow passage to prevent flow communication between the first and second chambers prior to the first use of the device.

52. The device of claim 43, further comprising a pump configured to flow the product from the first chamber.

53. The device of claim 52, wherein the actuator is operably coupled to the pump such that actuation of the actuator causes pumping of the pump.

54. The device of claim 53, wherein the actuator includes a push-button on the pump.

55. The device of claim 52, further comprising a dip tube extending from the pump into the first chamber to place the pump in flow communication with the first chamber.

56. The device of claim 52, wherein the pump defines an air intake orifice configured to be in flow communication with the second chamber.

57. The device of claim 56, wherein the air intake orifice is configured to flow air from outside the device to inside the second chamber in response to actuation of the pump dispensing the product from the first chamber.

58. The device of claim 56, wherein the air intake orifice is configured to flow an amount of air into the second chamber approximately equal to the amount of the product dispensed from the first chamber.

59. The device of claim 58, wherein an amount of second composition substantially equal to the amount of air flowed through the air intake orifice flows from the second chamber toward the first chamber as the product in the first chamber is dispensed from the first chamber.

60. The device of claim 43, wherein the first chamber is substantially sealed from air intake when the second composition is contained in the second chamber.

61. The device of claim 43, wherein an amount of the product in the first chamber remains substantially constant until substantially all of the second composition initially in the second chamber has been flowed from the second chamber.

62. A device for dispensing a product, comprising:

a first chamber configured to initially contain at least one of a first composition and a mixture of the first composition and a second composition;

a second chamber configured to be in flow communication with the first chamber and to contain the second composition; and an actuator configured to be actuated to cause an amount of product contained in the first chamber to be dispensed from the first chamber, the product including one of the first composition, the second composition, and the mixture of the first and second compositions, wherein the device is configured such that second composition flows from the second chamber to the first chamber when the product is dispensed, and wherein the device is configured such that concentration of the product dispensed from the first chamber is a function of a total amount of product that has been dispensed from the first chamber.

63. The device of claim 62, wherein the device is configured to automatically vary an amount of the second composition in the product being dispensed.

64. The device of claim 62, wherein the first chamber initially contains one of the first composition and the mixture, and the second chamber contains the second composition, and wherein the first and second compositions have differing characteristics.

65. The device of claim 62, wherein the product dispensed from the first chamber is dispensed from the device.

66. The device of claim 62, wherein the first chamber initially contains one of the first composition and the mixture, and the second chamber contains the second composition, and wherein the product dispensed from the first chamber has an effect that varies with the concentration of the product.

67. The device of claim 66, wherein the effect is at least one of a cosmetic, pharmaceutical, and dermatological effect on at least one of skin and hair.

68. The device of claim 67, wherein the effect is an effect on skin color.

69. The device of claim 67, wherein the effect is an effect on hair color.

70. The device of claim 67, wherein the effect is an effect on sun protection factor.

71. The device of claim 62, further comprising a flow passage for placing the first and second chambers in flow communication with each other.

72. The device of claim 71, wherein the flow passage has a first end opening into the second chamber, a second end opening into the first chamber, and a substantially inverted U-shaped portion between the first and the second ends.

73. The device of claim 71, wherein the flow passage is configured to prevent flow communication of the first and second chambers prior to a first use of the device to dispense the product.

74. The device of claim 73, further comprising a removable cover configured to cover a dispensing orifice through which the product flows from the first chamber and out of the device, wherein removing the removable cover permits the flow passage to place the first and second chambers in flow communication.

75. The device of claim 74, wherein the removable cover is operably coupled to a clamping mechanism configured to clamp the flow passage to prevent flow communication between the first and second chambers prior to the first use of the device.

76. The device of claim 62, further comprising a pump configured to flow the product from the first chamber.

77. The device of claim 76, wherein the actuator is operably coupled to the pump such that actuation of the actuator causes pumping of the pump.

78. The device of claim 77, wherein the actuator includes a push-button on the pump.

79. The device of claim 76, further comprising a dip tube extending from the pump into the first chamber to place the pump in flow communication with the first chamber.

80. The device of claim 76, wherein the pump defines an air intake orifice configured to be in flow communication with the second chamber.

81. The device of claim 80, wherein the air intake orifice is configured to flow air from outside the device to inside the second chamber in response to actuation of the pump dispensing the product from the first chamber.

82. The device of claim 80, wherein the air intake orifice is configured to flow an amount of air into the second chamber approximately equal to the amount of the product dispensed from the first chamber.

83. The device of claim 82, wherein an amount of second composition substantially equal to the amount of air flowed through the air intake orifice flows from the second chamber toward the first chamber as the product in the first chamber is dispensed from the first chamber.

84. The device of claim 80, wherein the first chamber is substantially sealed from air intake when the second chamber contains the second composition.

85. The device of claim 62, wherein the first chamber and the second chamber have approximately the same volume.

86. The device of claim 62, wherein an amount of the product in the first chamber remains substantially constant until all the second composition initially contained in the second chamber has been moved from the second chamber.

87. The device of claim 62, wherein the device has a size permitting the device to be held in a single hand of a user while the product is dispensed.

88. A dispensing device comprising:

a first chamber configured to initially contain at least one of a first composition and a mixture of the first composition and a second composition;

a second chamber configured to contain the second composition, the second chamber being in flow communication with the first chamber; and a portion including a dispensing outlet of the device being in flow communication with the first chamber to dispense contents of the first chamber, wherein the first chamber is at least temporarily sealed from air intake so that the dispensing of the contents of the first chamber via the dispensing outlet induces flow of the second composition from the second chamber to the first chamber.

89. The device of claim 88, wherein the device is configured such that the second composition flows from the first chamber to the second chamber to permit mixing of the second composition with the contents of the first chamber.

90. The device of claim 88 further comprising a pump in flow communication with the first chamber to dispense contents of the first chamber through the dispensing outlet.

91. The device of claim 90, wherein the pump is configured to apply a vacuum force to remove contents from the first chamber, the vacuum force inducing the flow of the second composition from the second chamber to the first chamber.

92. The device of claim 90, wherein the pump includes an actuator for actuating the pump.

93. The device of claim 90, wherein the pump includes an air intake configured to provide air intake into the second chamber.

94. The device of claim 88, further comprising a flow passage for providing flow communication between the first and second chambers to enable flow of the second composition from the second chamber to the first chamber.

95. The device of claim 94, wherein the flow passage includes a duct including at least a portion having a substantially U-shaped configuration.

96. The device of claim 94, wherein the flow passage has a first end opening into the second chamber and a second end opening into the first chamber, the second end being disposed below the first end.

97. The device of claim 94, wherein the passage is configured in the form of a siphon.

98. The device of claim 88, wherein the first chamber contains one of the first composition and the mixture and the second chamber contains the second composition.

99. The device of claim 98, wherein the device is configured such that the contents of the first chamber include increasing amounts of the second composition as the contents are dispensed.

100. The device of claim 88 further comprising an air intake configured to provide air intake into the second chamber.

101. The device of claim 100, wherein second composition in the second chamber prevents air intake to the first chamber.

102. The device of claim 88, wherein the device is configured such that an amount of the contents in the first chamber remains substantially constant until substantially all of the second composition initially in the second chamber has flowed from the second chamber.

103. The device of claim 88, wherein the device is configured such that the amount of second composition passing into the first chamber from the second chamber substantially corresponds to the amount of contents dispensed from the first chamber.

104. The device of claim 88, wherein the device has a size permitting the device to be held in a single hand of the user while the contents are dispensed.

105. The device of claim 88, wherein the first and second chambers are defined in a single piece of molded plastic material.

106. A dispensing device comprising:

a first chamber;

a second chamber;

a portion including a dispensing outlet being in flow communication with the first chamber to dispense contents of the first chamber; and a flow passage for providing flow from the second chamber to the first chamber, wherein the flow passage includes a duct including at least a portion having a substantially U-shaped portion.

107. The device of claim 106, wherein the substantially U-shaped portion includes a curved section and a pair of leg sections extending from the curved section, the curved section being located above the leg sections and being adjacent to an upper end of the device.

108. The device of claim 107, wherein an uppermost portion of the curved section is above at least one of a maximum fill level of the first chamber and a maximum fill level of the second chamber.

109. The device of claim 106, wherein the flow passage includes a first end opening into the second chamber and a second end opening into the first chamber, the first end being above the second end.

110. The device of claim 106, wherein a bottom of the second chamber is above the bottom of the first chamber.

111. The device of claim 106, further comprising a pump to dispense contents of the first chamber through the dispensing outlet.

112. The device of claim 111, wherein the pump is configured to apply a vacuum force to remove contents from the first chamber, the vacuum force inducing flow from the second chamber to the first chamber via the flow passage.

113. The device of claim 111, wherein the pump includes an actuator for actuating the pump.

114. The device of claim 111, wherein the pump includes an air intake passage.

115. The device of claim 111, further comprising a dip tube extending from the pump into the first chamber.

116. The device of claim 106, wherein the first chamber contains one of a first composition and a mixture of the first composition and a second composition, and wherein the second chamber contains the second composition, the second composition flowing to the first chamber via the flow passage in response to dispensing from the first chamber.

117. The device of claim 116, wherein at least one of the first and second compositions has an effect chosen from a cosmetic, pharmaceutical, and dermatological effect.

118. The device of claim 116, wherein a first part of the flow passage initially contains the one of the first composition and the mixture and a second part of the flow passage initially contains the second composition.

119. The device of claim 118, wherein air is initially contained in the flow passage between the first and second parts.

120. The device of claim 116, further comprising a separation mechanism configured to limit flow through the flow passage.

121. The device of claim 106, wherein the device has a size permitting the device to be held in a single hand of a user while the contents are dispensed.

122. The device of claim 106, wherein the first and second chambers and the flow passage are defined in a single piece of molded plastic material.

123. A dispensing device comprising:

a first chamber;

a second chamber;

a portion including a dispensing outlet being in flow communication with the first chamber to dispense contents of the first chamber; and a flow passage for providing flow from the second chamber to the first chamber, the flow passage being configured in the form of a siphon.

124. The device of claim 123, wherein a bottom of the second chamber is above a bottom of the first chamber.

125. The device of claim 123, further comprising a pump to dispense contents of the first chamber through the dispensing outlet.

126. The device of claim 125, wherein the pump is configured to apply a vacuum force to remove contents from the first chamber, the vacuum force inducing flow from the second chamber to the first chamber via the flow passage.

127. The device of claim 125, wherein the pump includes an actuator for actuating the pump.

128. The device of claim 125, wherein the pump includes an air intake passage.

129. The device of claim 125, further comprising a dip tube extending from the pump into the first chamber.

130. The device of claim 123, wherein the first chamber contains one of a first composition and a mixture of the first composition and a second composition, and wherein the second chamber contains the second composition, the second composition flowing to the first chamber via the flow passage in response to dispensing from the first chamber.

131. The device of claim 130, wherein at least one of the first and second compositions has an effect chosen from a cosmetic, pharmaceutical, and dermatological effect.

132. The device of claim 130, wherein a first part of the flow passage initially contains the one of the first composition and the mixture and a second part of the flow passage initially contains the second composition.

133. The device of claim 132, wherein air is initially contained in the flow passage between the first and second parts.

134. The device of claim 130, further comprising a separation mechanism configured to limit flow through the flow passage.

135. The device of claim 123, wherein the device has a size permitting the device to be held in a single hand of a user while the contents are dispensed.

136. The device of claim 123, wherein the first and second chambers and the flow passage are defined in a single piece of molded plastic material.

137. A method of dispensing, the method comprising:

providing a dispenser having a first chamber containing at least one of a first composition and a mixture of the first composition and a second composition, and a second chamber containing the second composition, said first and second chambers being in flow communication with each other;

flowing contents of the first chamber from the dispenser to dispense a portion of the contents; and passing second composition from the second chamber to the first chamber in response to the portion of the contents of the first chamber being dispensed.

138. The method of claim 137, further comprising preventing flow communication between the first and second chambers prior to a first flowing of the contents from the first chamber.

139. The method of claim 138, further comprising placing the first and second chambers in flow communication with each other.

140. The method of claim 137, wherein the flowing from the dispenser includes initially flowing the first composition and then flowing the mixture from the dispenser.

141. The method of claim 140, wherein an amount of second composition in the mixture increases as more second composition is passed into the second chamber.

142. The method of claim 137, further comprising mixing the second composition passing into the first chamber with the contents of the first chamber.

143. The method of claim 137, wherein the passing includes flowing the second composition from the second chamber toward the first chamber in an amount substantially equal to the amount of the contents flowing from the first chamber.

144. The method of claim 137, further comprising intaking an amount of air from outside the dispenser into the second chamber in an amount substantially equal to the amount of the second composition that flows from the second chamber toward the first chamber during the passing.

145. The method of claim 137, wherein the flowing from the first chamber includes pumping from the first chamber via a pump in flow communication with the first chamber.

146. The method of claim 144, wherein the pump includes an air intake orifice, the air intake orifice flowing air outside the dispenser into the second chamber during pumping.

147. The method of claim 137, further comprising varying the respective amounts of the first composition and the second composition in the contents as a function of a total amount of the contents flowed from the first chamber.

148. The method of claim 137, wherein the flowing of the contents of the first chamber includes automatically varying the respective amounts of the first composition and the second composition in the contents in the first chamber in response to the flowing.

149. The method of claim 137, wherein the flowing includes flowing the second composition from the first chamber after a predetermined amount of one of the first composition and the mixture has flowed from the first chamber.

150. The method of claim 137, wherein the flowing from the first chamber includes flowing without air intake into the first chamber when the second chamber contains the second composition.

151. The method of claim 137, wherein the flowing includes dispensing from the dispenser a product having at least one of a cosmetic, pharmaceutical and dermatological effect.

152. The method of claim 151, further comprising applying the product to at least one of hair and skin of an individual.

153. The method of claim 152, wherein the dispensing of the product includes dispensing onto the skin a product having an effect on skin color.

154. The method of claim 152, wherein the dispensing of the product includes dispensing onto the hair a product having an effect on hair color.

155. The method of claim 152, wherein the dispensing of the product includes dispensing onto the skin a product having a sun protection factor effect.

156. The method of claim 151, wherein the effect varies with the relative amount of at least one of the first composition and the second composition that flows from the first chamber.

157. The method of claim 151, wherein the effect varies with the total amount of the contents flowed from the first chamber.

158. The method of claim 137, wherein the passing includes transferring the second composition to the second chamber via a flow passage including a siphon.

159. A method of dispensing a product, the method comprising:

providing a dispenser containing a first composition and a second composition substantially separated from one another prior to dispensing, the first composition and the second composition having at least one differing characteristic;

flowing a product from the dispenser, the product including relative amounts of the first and second compositions; and increasing, in response to a total amount of product flowed from the dispenser, the amount of second composition in the product flowing from the dispenser.

160. The method of claim 159, further comprising initially flowing the first composition alone from the dispenser.

161. The method of claim 159, further comprising mixing together the first composition and the second composition during the flowing of the product from the dispenser.

162. The method of claim 159, wherein the flowing includes pumping the product from the dispenser.

163. The method of claim 159, wherein the pumping includes flowing outside air into the dispenser in an amount substantially corresponding to an amount of the product flowed from the dispenser.

164. The method of claim 159, wherein the providing of the dispenser includes providing a dispenser having a first chamber containing the first composition and a second chamber containing the second composition, the first and second chambers being in flow communication with each other.

165. The method of claim 164, wherein the flowing of the product from the dispenser includes flowing the product from the first chamber.

166. The method of claim 165, further comprising passing the second composition from the second chamber toward the first chamber.

167. The method of claim 165, wherein an amount of the product in the first chamber remains substantially constant until substantially all of the second composition initially contained in the second chamber has passed from the second chamber toward the first chamber.

168. The method of claim 167, wherein air is prevented from flowing into the first chamber when the second chamber contains the second composition.

169. The method of claim 159, wherein the product flowed from the dispenser includes at least one of a cosmetic, a pharmaceutical, and a dermatological effect.

170. The method of claim 169, further comprising applying the product to at least one of hair and skin of an individual.

171. The method of claim 169, wherein the effect varies with the ratio of the first composition to the second composition in the product.

172. The method of claim 170, wherein the product is applied to the skin and the effect is an effect on skin color.

173. The method of claim 170, wherein the product is applied to the hair and the effect is an effect on hair color.

174. The method of claim 170, wherein the product is applied to the skin and the effect is a sun protection factor effect.

175. A method of dispensing a product, the method comprising:

providing the device of claim 1 with the first chamber containing at least the first composition and the second chamber containing the second composition; and actuating the actuator to dispense an amount of the product from the first chamber and out of the device.

176. The method of claim 175, further comprising varying relative amounts of the first composition and the second composition dispensed out of the device by actuating the actuator a predetermined number of times.

177. The method of claim 176, wherein the varying of relative amounts of the first and second compositions includes varying at least one of a cosmetic, a dermatological, and a pharmaceutical effect of the product.

178. The method of claim 175, further comprising varying relative amounts of the first composition and the second composition in the product dispensed out of the device as a function of a total amount of the product dispensed out of the device.

179. The method of claim 178, wherein the varying of relative amounts of the first and second compositions includes varying at least one of a cosmetic, a dermatological, and a pharmaceutical effect of the product.

180. The method of claim 175, further comprising applying the product dispensed out of the device to at least one of hair and skin.

181. The method of claim 180, wherein the product changes color of at least one of hair and skin.

182. The method of claim 181, wherein the color change of the at least one of the hair and the skin increases with a total amount of the product that has been dispensed out of the device.

183. The method of claim 180, wherein the applying of the product includes applying a sun protection factor to the at least one of the hair and the skin.

184. The method of claim 183, wherein the sun protection factor decreases with a total amount of the product that has been dispensed out of the device.

185. A method of dispensing a product, the method comprising:

providing the device of claim 43 with the first chamber containing at least the first composition and the second chamber containing the second composition; and actuating the actuator to dispense an amount of product from the first chamber and out of the device.

186. The method of claim 185, further comprising varying the concentration of the product dispensed from the first chamber by mixing the first and second compositions in the first chamber.

187. The method of claim 186, wherein the varying of the concentration of the product dispensed from the first chamber includes varying at least one of a cosmetic, a dermatological, and a pharmaceutical effect of the product.

188. The method of claim 185, wherein the actuating includes actuating the actuator a predetermined number of times to dispense the product from the dispenser thereby automatically varying the concentration of the product dispensed from the first chamber.

189. The method of claim 185, further comprising applying the product dispensed out of the device to at least one of hair and skin.

190. The method of claim 189, wherein the product changes color of at least one of hair and skin.

191. The method of claim 190, wherein the color change of the at least one of hair and skin increases with a total amount of the product that has been dispensed out of the device in response to actuating the actuator.

192. The method of claim 189, wherein the applying of the product includes applying a sun protection factor to the at least one of the hair and the skin.

193. The method of claim 192, wherein the sun protection factor decreases with a total amount of the product that has been dispensed out of the device in response to actuating the actuator.

194. A method of dispensing a product, the method comprising:

providing the device of claim 88 with the first chamber containing at least the first composition and the second chamber containing the second composition; and dispensing an amount of product from the first chamber and out of the device, the product including one of the first composition and a mixture of the first composition and the second composition.

195. The method of claim 194, further comprising varying the concentration of the product dispensed from the first chamber by mixing the first and second compositions in the first chamber.

196. The method of claim 194, wherein the dispensing includes dispensing the product a plurality of times, the dispensing varying the concentration of the product dispensed from the first chamber.

197. The method of claim 194, wherein the product has at least one of a cosmetic, a dermatological, and a pharmaceutical effect.

198. The method of claim 197, further comprising applying the product dispensed out of the device to at least one of hair and skin.

199. The method of claim 198, wherein the applying of the product changes color of at least one of hair and skin.

200. The method of claim 199, wherein the color change of the at least one of hair and skin increases with a total amount of the product that has been dispensed out of the device.

201. The method of claim 198, wherein the applying of the product includes applying a sun protection factor to the at least one of the hair and the skin.

202. The method of claim 201, wherein the sun protection factor decreases with a total amount of the product that has been dispensed out of the device.

203. A method of dispensing a product, the method comprising:

providing the device of claim 106 with the first chamber containing at least a first composition and the second chamber containing a second composition; and dispensing an amount of product from the first chamber and out of the device, the product including at least one of the first composition and a mixture of the first and second compositions.

204. The method of claim 203, wherein the dispensing includes dispensing the product a plurality of times, the dispensing varying the concentration of the product dispensed from the first chamber.

205. The method of claim 204, wherein the varying of the concentration of the product dispensed from the first chamber includes varying at least one of a cosmetic, a dermatological, and a pharmaceutical effect of the product.

206. The method of claim 203, wherein the dispensing includes initially dispensing the first composition alone and then dispensing the mixture.

207. The method of claim 206, further comprising varying a concentration of the mixture in the first chamber.

208. The method of claim 207, wherein at least one of a cosmetic, a dermatological, and a pharmaceutical effect of the product varies with the concentration of the mixture.

209. The method of claim 206, wherein upon further dispensing from the first chamber, relative amounts of the first composition and the second composition in the mixture varies.

210. The method of claim 209, wherein at least one of a cosmetic, a dermatological, and a pharmaceutical effect of the product varies with the relative amounts of the first composition and the second composition in the mixture.

211. The method of claim 203, further comprising applying the product dispensed out of the device to at least one of hair and skin.

212. The method of claim 211, wherein the product changes color of at least one of hair and skin.

213. The method of claim 212, wherein the color change of the at least one of hair and skin increases with a total amount of the product that has been dispensed out of the device.

214. The method of claim 211, wherein the applying of the product includes applying a sun protection factor to the at least one of the hair and the skin.

215. The method of claim 214, wherein the sun protection factor decreases with a total amount of the product that has been dispensed out of the device.

216. A dispensing device comprising:

a first chamber containing a first composition;

a second chamber containing a modifying composition;

means, capable in response to an actuation command, for dispensing a given volume of contents from the first chamber; and a flow passage configured, in response to the dispensing of said given volume of contents from the first chamber, for passing a portion of said modifying composition from the second chamber toward the first chamber.

217. The device of claim 216, wherein the device is configured such that the given volume of contents being dispensed from the first chamber is initially the first composition and, after at least one actuation command, includes both the first composition and the modifying composition.

218. The device of claim 216, wherein the device is configured such that the contents of the first chamber include increasing amounts of the modifying composition as the contents are dispensed.

* * * * *